(No Model.)
W. MERRELL.
Device for Watering Stock.
No. 242,351. Patented May 31, 1881.
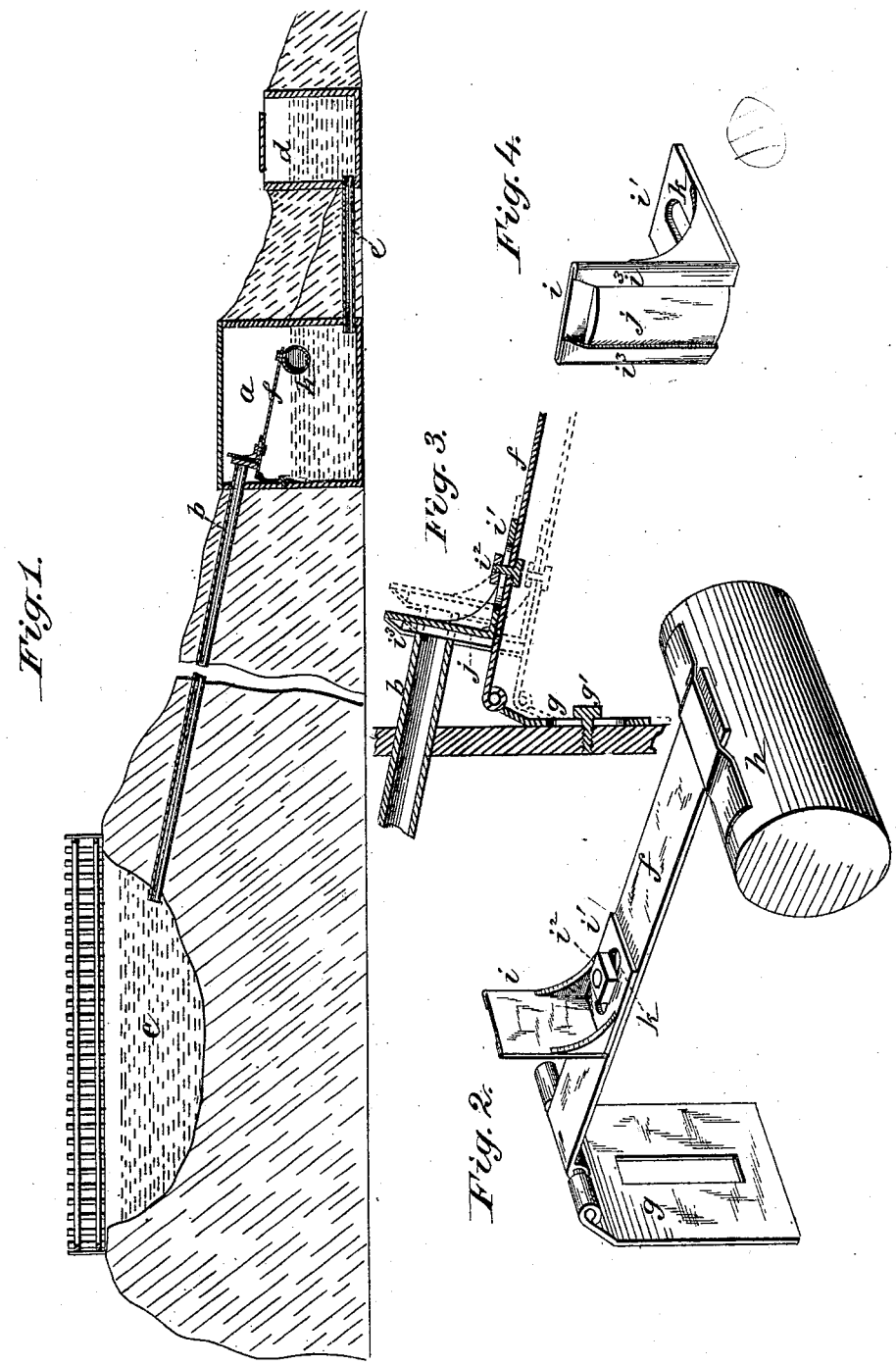
Witnesses:
W. H. H. Knight
Floyd Norris
Inventor:
pro William Merrell
Johnson and Johnson
Attys.

UNITED STATES PATENT OFFICE.

WILLIAM MERRELL, OF DEER RIDGE, MISSOURI.

DEVICE FOR WATERING STOCK.

SPECIFICATION forming part of Letters Patent No. 242,351, dated May 31, 1881.

Application filed November 26, 1880. (No model.)

*To all whom it may concern:*

Be it known that I, WILLIAM MERRELL, a citizen of the United States, residing at Deer Ridge, in the county of Lewis and State of Missouri, have invented new and useful Improvements in Devices for Watering Stock, of which the following is a specification.

My invention relates to devices for watering stock, in which the water in the watering-trough is always kept at the same level by a valve carried and operated by a float within a box communicating with said trough.

The objects of my improvement are to provide a very simple construction of float and valve for closing the supply-pipe, and in which the valve is made adjustable upon the float-arm, whereby it may be set to properly close the open end of a horizontal supply-pipe without regard to the distance it projects within the box, or the point at which the float-arm is hinged in relation to said pipe, such hinged connection of the float-arm being made adjustable vertically by a wall-bracket, and thus co-operate with the horizontally-adjustable valve to effect its proper relation with the supply-pipe.

Referring to the accompany drawings, Figure 1 represents a vertical section of a stock-watering device embracing my improvement, the valve being shown as closed; Fig. 2, the float and its valved arm detached from the box into which the supply-pipe opens; Fig. 3, an enlarged sectional view of the adjustable valve, showing its relation to the supply-pipe, and Fig. 4 the valve.

The box $a$, which contains the float and its operating-valve, is about twelve inches wide, fourteen inches long, and ten inches deep. The supply-pipe $b$ enters at one end of this box, near its top, and extends to and communicates with a pond, $c$, of water, which is usually formed and fenced in near by, and at a higher level than the box $a$, so that the water will run into the latter through the pipe $b$, which is usually laid under the ground.

The drinking-trough $d$ communicates with the supply-box $a$ at the bottom thereof by the pipe $e$, and there may be several drinking-troughs placed in such supply-communication. The box $a$ is covered and protected from freezing by sawdust or leaves, and the watering-troughs are surrounded with earth and provided with covers having drinking-openings.

The valve and float arm $f$ is hinged to a vertically-adjustable slotted bracket, $g$, by screws $g'$ on the wall of the box $a$, just beneath and in line with the supply-pipe $b$, and the float $h$ is secured to the free end of said arm. The valve-seat rises from the arm $f$ and holds the valve in position to close the end of the supply-pipe $b$ when the float is raised by the water running from said pipe into the box. The valve-seat is formed in a vertical plate, $i$, having a horizontal slotted base, $i'$, by which it is firmly secured to said arm by a screw, $i^2$, while the face of said plate, fronting the open end of the supply-pipe, is formed with return-lips $i^3$ at the opposite edges, within and between which the valve $j$, of leather or other suitable material, is fitted and held, so that it may be easily removed and replaced by a new piece, as it requires no fastening other than being inserted in the pocket formed by the return-lips of the valve-seat. As the valve closes when it approaches a vertical position and the arm of the float approaches a horizontal position, and as the end of the supply-pipe is fixed as to its projection into the box, I make the valve-seat adjustable upon said arm by the longitudinal slot $k$, and secure it by a screw and nut to the valve-arm, so that the valve-seat can be set in the proper position, nearer to or farther from the supply-pipe, to make a close fit with said pipe in connection with the vertical adjustment of the hinged end of the float-arm. This construction avoids the necessity and trouble of having to set the hinge of the valve-arm at a particular point, and of having the pipe project into the box a specific distance to make the valve close properly therewith, and gives a cheap, simple, and durable construction.

When the valve is adjusted and secured it cannot get out of a true closing with the pipe. As the float lowers in the box the water flows in from the pond and keeps the drinking-troughs full, and when so filled the float rises, and, closing the supply-pipe, cuts off the water.

I claim—

1. In a device for watering stock, the slotted adjustable valve-seat $i$ and its clamping-screw $i^2$, in combination with the supply-pipe $b$, the float $h$, and its carrying-arm $f$, hinged to the wall of the supply-box, substantially as described, for the purpose specified.

2. The valve-seat $i$, provided with the slotted base $i'$, the return pocket-forming-lips $i^3$, and the valve $j$, in combination with the float-arm and the supply-pipe $b$, substantially as and for the purpose set forth.

3. The combination, in a watering device for stock, of the adjustable valve, substantially as described, with the adjustable wall-bracket for the hinged end of the float-arm, substantially as described, for the purpose specified.

In testimony whereof I have hereunto set my hand in the presence of two subscribing witnesses.

WILLIAM MERRELL.

Witnesses:
W. F. HALDEMAN,
JAMES HALDEMAN.